(12) United States Patent
Storm et al.

(10) Patent No.: US 8,783,708 B2
(45) Date of Patent: Jul. 22, 2014

(54) COLLAPSIBLE STROLLER

(75) Inventors: Gerjan Storm, Eindhoven (NL); Petrus Henricus Maria Stokman, Hoensbroek (NL); John Gert Til van Dijk, Helmond (NL)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 13/603,140

(22) Filed: Sep. 4, 2012

(65) Prior Publication Data
US 2013/0056961 A1    Mar. 7, 2013

(30) Foreign Application Priority Data

Sep. 2, 2011   (NL) ..................................... 2007332

(51) Int. Cl.
*B62B 7/00*         (2006.01)
(52) U.S. Cl.
USPC .................... 280/650; 280/642; 280/47.38
(58) Field of Classification Search
USPC .............. 280/642, 649, 647, 658, 650, 47.38
See application file for complete search history.

(56) References Cited

U.S. PATENT DOCUMENTS

| | | | | |
|---|---|---|---|---|
| 2,982,336 | A | | 5/1961 | Minici |
| 4,239,259 | A | * | 12/1980 | Martinez ....................... 280/649 |
| 4,324,410 | A | * | 4/1982 | Perego ......................... 280/642 |
| 4,506,906 | A | * | 3/1985 | Allden ......................... 280/642 |
| 5,234,224 | A | * | 8/1993 | Kim ............................. 280/650 |
| 6,715,783 | B1 | * | 4/2004 | Hanson et al. ................ 280/642 |
| 7,055,840 | B1 | * | 6/2006 | Kelso ........................... 280/649 |
| 7,341,310 | B1 | * | 3/2008 | Ross ....................... 297/344.17 |
| 7,694,996 | B2 | * | 4/2010 | Saville et al. ................ 280/642 |
| 7,789,402 | B2 | * | 9/2010 | Saville et al. ............. 280/47.38 |

FOREIGN PATENT DOCUMENTS

| | | |
|---|---|---|
| DE | 29515234 | 11/1995 |
| EP | 2141058 A2 | 1/2010 |
| EP | 2141058 A3 | 5/2011 |
| GB | 2113625 | 8/1983 |

* cited by examiner

*Primary Examiner* — Hau Phan
(74) *Attorney, Agent, or Firm* — Barnes & Thornburg LLP (57) ABSTRACT

A collapsible stroller includes a collapsible seat-support frame and a frame lock coupled to the seat-support frame. The frame lock is operable by a caregiver to retain the seat-support frame in an erect configuration or release the seat-support frame so that it is free to move to a collapsed storage configuration.

13 Claims, 12 Drawing Sheets

COLLAPSIBLE STROLLER

PRIORITY CLAIM

This application claims priority to Netherlands Application No. 2007332, filed Sep. 2, 2011, which is expressly incorporated by reference herein.

BACKGROUND

The present disclosure relates to a juvenile stroller, and particularly to a stroller having a collapsible frame arranged to support a juvenile seat in an expanded use position and in a collapsed storage position. More particularly, the present disclosure relates to a collapsible stroller having a lock to lock the frame in the expanded use position.

SUMMARY

A stroller in accordance with the present disclosure includes a collapsible seat-support frame adapted to support a juvenile seat. In illustrative embodiments, the juvenile seat is made of a pliable material that expands to provide a seat shell sized and shaped to seat a juvenile when the seat-support frame is unfolded by a caregiver to assume an expanded use position. The pliable seat shell contracts to assume a more compact shape when the seat-support frame is folded by the caregiver to assume a collapsed storage position.

In illustrative embodiments, the stroller further includes a frame lock coupled to the collapsible seat-support frame. The frame lock includes a first lock member pivotably coupled to a first frame rod included in the collapsible seat-support frame and a second lock member pivotably coupled to a second frame rod included in the collapsible seat-support frame. The first and second frame rods cooperate to form a spine extending from a push handle to a wheel unit and are coupled to one another at a spine joint for pivotable movement about a rod pivot axis during folding and unfolding of the collapsible seat-support frame. The frame lock is positioned to lie between the spine joint and the wheel unit when the collapsible seat-support frame is moved to assume the expanded (erect) use position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 7:
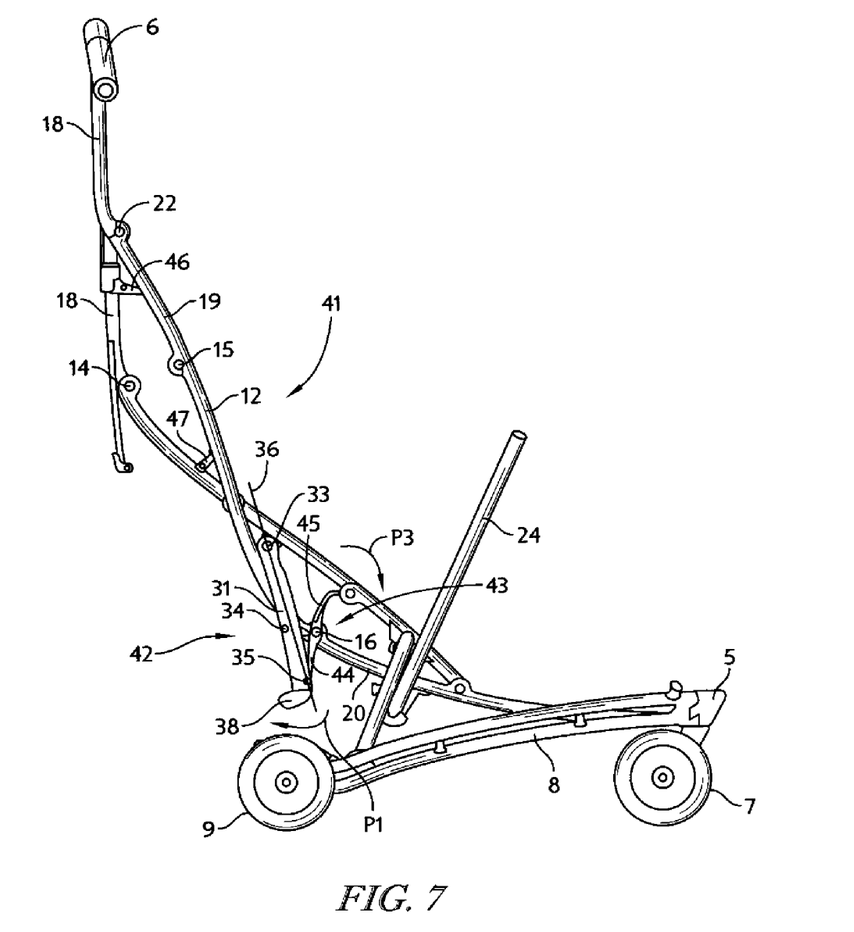
FIG. 7 is a side view of a second embodiment of a stroller according to the present disclosure in the erect and locked configuration of the seat-support frame.
Figure 8:
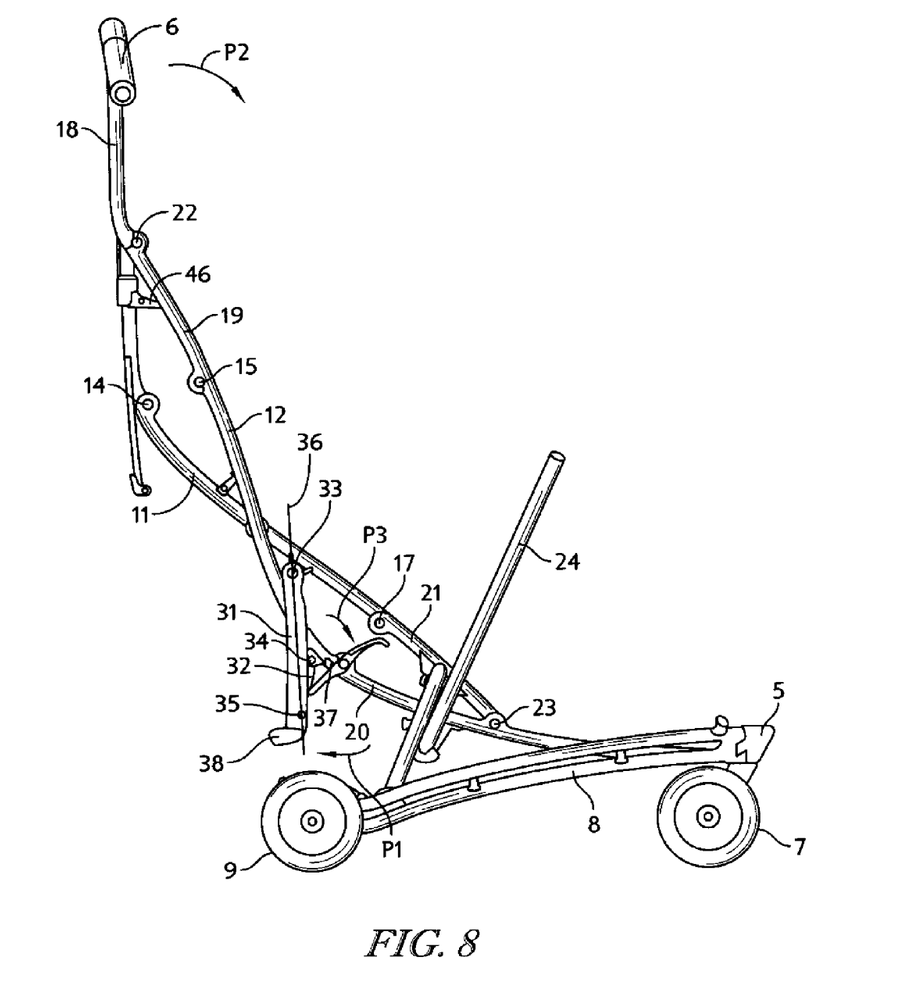
FIG. 8 is a side view of the stroller as shown in FIG. 7 in the unlocked and partly collapsed configuration of the seat-support frame.
Figure 9:
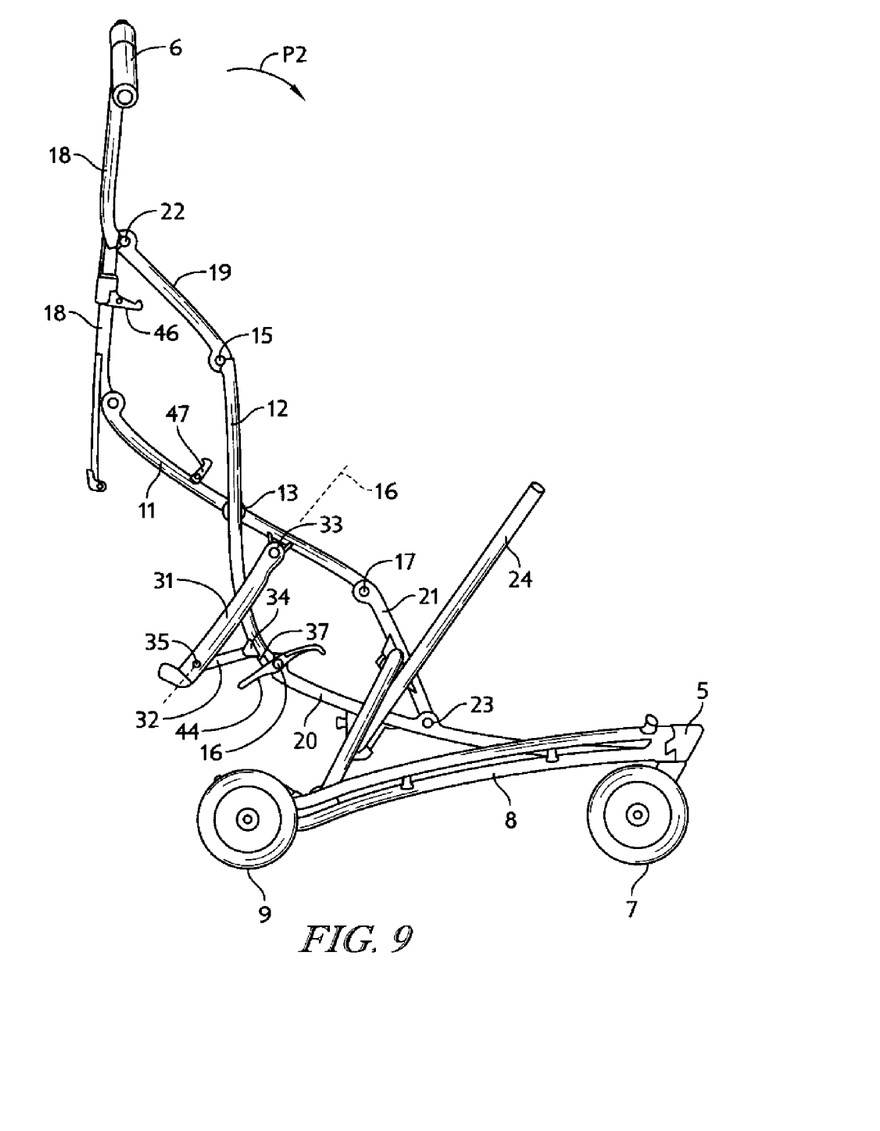
FIG. 9 is a side view of the stroller as shown in FIG. 7 in a further partly collapsed configuration of the seat-support frame.

A collapsible stroller 1 including a frame lock 30 in accordance with a first embodiment of the present disclosure is shown in FIGS. 1A-6. A collapsible stroller 41 including a frame lock 42 in accordance with a second embodiment of the present disclosure is shown in FIGS. 7-9. Each frame lock 30, 42 is configured in accordance with the present disclosure to provide means for locking and unlocking a collapsible seat-support frame 3 included in each of collapsible stroller 1 or 41 at the option of a caregiver.

Figure 1A:
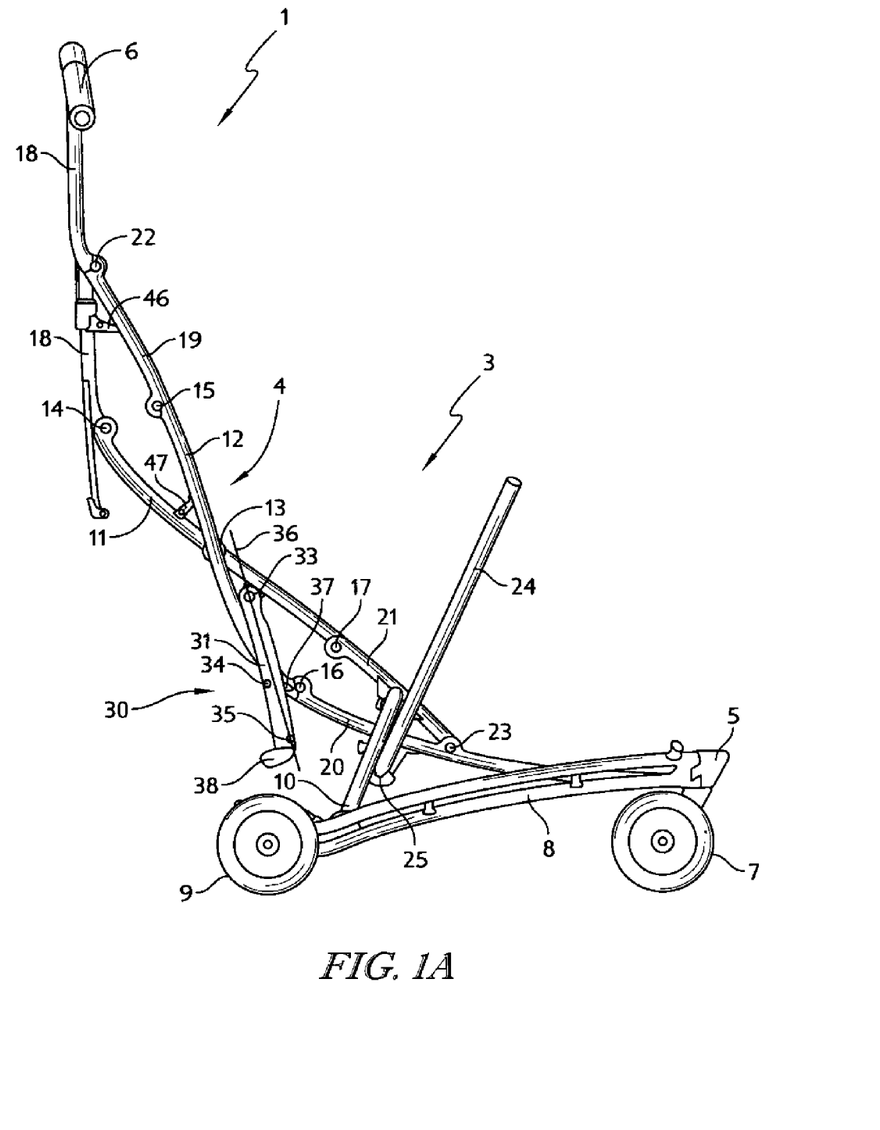
FIG. 1A is a side view of a first embodiment of a stroller according to the present disclosure in the erect and locked configuration of the seat-support frame.

As suggested in FIG. 1A, collapsible stroller 1 comprises a collapsible seat-support frame 3 that is configured to support a juvenile seat (not shown). It is within the scope of this disclosure to configure a juvenile seat to mount on collapsible seat-support frame 3 and carry a juvenile (not shown) when seat-support frame 3 is locked in an expanded use position as shown, for example, in FIG. 1A. Once a caregiver operates frame lock 30 to unlock seat-support frame 3 in a first step suggested in FIGS. 2A and 2B and in a subsequent second step suggested in FIGS. 3A and 3B, seat-support frame 3 can be collapsed manually by the caregiver in a controlled manner as disclosed herein to move to assume a collapsed storage position shown, for example, in FIG. 6.

In illustrative embodiments, seat-support frame 3 includes an elongate spine 4, a coupler 5, front wheels 7, rear wheel-support arms 8, rear wheels 9, and a handle assembly 6 as suggested in FIG. 1A. Spine 4 comprises a first frame rod 11 coupled at a spine joint 13 to second frame rod 12 for pivotable movement relative to second frame rod 12 as shown, for example, in FIGS. 1A-3A, 5, and 6. Frame lock 30 is coupled to first and second frame rods 11, 12 as suggested in FIGS. 1A-6.

The stroller 1 comprises a seat-support frame 3 provided with an elongate spine 4 as suggested in FIG. 1A. The spine 4 is curved to define a seating cavity within the seat-support frame 3 in which a flexible juvenile seat (not shown) can be located. The spine 4 is fixedly coupled at one end to a coupler 5 and is coupled at its other end to a handle assembly 6.

The seat-support frame 3 includes a front wheel 7 mounted on an underside of the coupler 5. Front wheels 7 provide in use of a frame 3 in its erect configuration ground-engaging support positioned to lie below the coupler 5. The frame 3 also includes a pair of rear-wheel support arms 8 extending rearwardly from the coupler 5. Each rear-wheel support arm 8 carries a rear-wheel 9 at the one end and is pivotably coupled to the coupler 5 at its other end as suggested in FIG. 1A.

In the erect configuration of the frame 3, as is shown in FIG. 1A, the rear-wheel support arms 8 are located relative to the coupler 5 so as to space the rear wheels 9 apart from each other and to provide ground-engaging support below the seating cavity. Each of the rear-wheel support arms 8 is linked to the spine 4 by means of an elongate, rigid, spine-link rod 10 that is pivotably connected at one end of the rear-wheel support arm 8 and at its other end to the spine 4.

The spine 4 comprises elongated, rigid frame rods 11, 12 mutually interconnected at a pivot defining a movable spine joint 13 lying part-way, preferably half-way, along the length of each first and second frame rod 11, 12 as suggested in FIG. 1A. The second frame rod 12 is constituted by two spaced, parallel, rigid, sub-members such that the second frame rod 12 is bifurcated along its whole length and especially in the vicinity of the spine joint 13.

Figure 5:
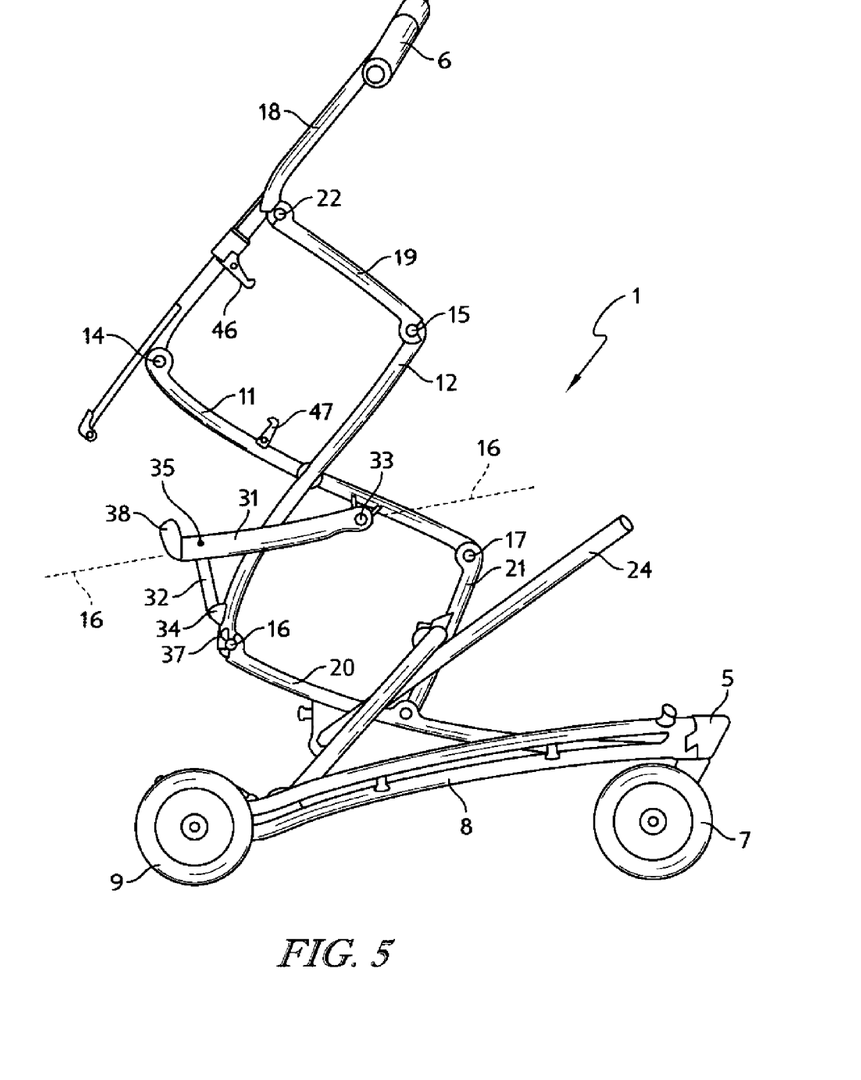
FIG. 5 is a side view of the stroller as shown in FIG. 1A in another further partly collapsed configuration of the seat-support frame.
Figure 6:
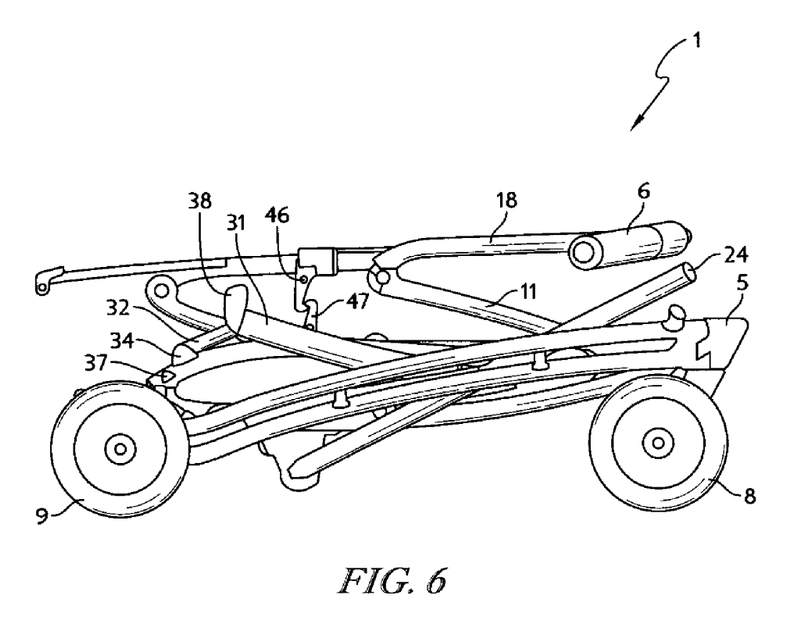
FIG. 6 is a side view of the stroller as shown in FIG. 1A in a fully collapsed configuration of the seat-support frame.

Along the length of the second frame rod 12, the spacing between the sub-members is slightly greater than the (typically circular or ovaloid) diameter of the first frame rod 11 such that the movable spine joint 13 may be constituted by a simple pivot pin that is fixed at either end to one of the sub-members and interconnects them so as to pass through an aperture extended from one side of the second frame rod 12 to the other in order to define a joint supporting first and second frame rods 11, 12 for relative pivotable movement about a pivot axis as suggested in FIGS. 1A, 5, and 6.

Each of the first and second frame rods 11, 12 is pivotably connected at pivots 14, 15, 16, 17 on each side of the spine joint 13 to subsidiary rods 18, 19, 20, 21 as suggested in FIG. 1A. Adjacent pairs of the subsidiary rods 18, 19, 20, 21 are pivotably secured together at pivots 22, 23 such that the spine 4 defines first and second closed loop kinematic linkages. Second subsidiary rod 19 is pivotably connected to the first subsidiary rod 18 part-way along the length of the first subsidiary rod 18. Third subsidiary rod 21 is pivotably connected to the fourth subsidiary rod 20 part-way along the length of the fourth subsidiary rod 20.

The pivotable connections of the subsidiary rods 18, 19, 20, 21 to the elongate rigid first and second frame rods 11, 12 and to one another as appropriate are such that the movements of the rods of the respective kinematic linkages are essentially uniplanar (subject to minor deflections caused by tolerancing of the pivotable joints and connections). The plane in which the spine 4 is located extends parallel to the normal forward driving direction of the stroller 1. The plane is located centrally in the seat-support frame 3.

Figure 2A:
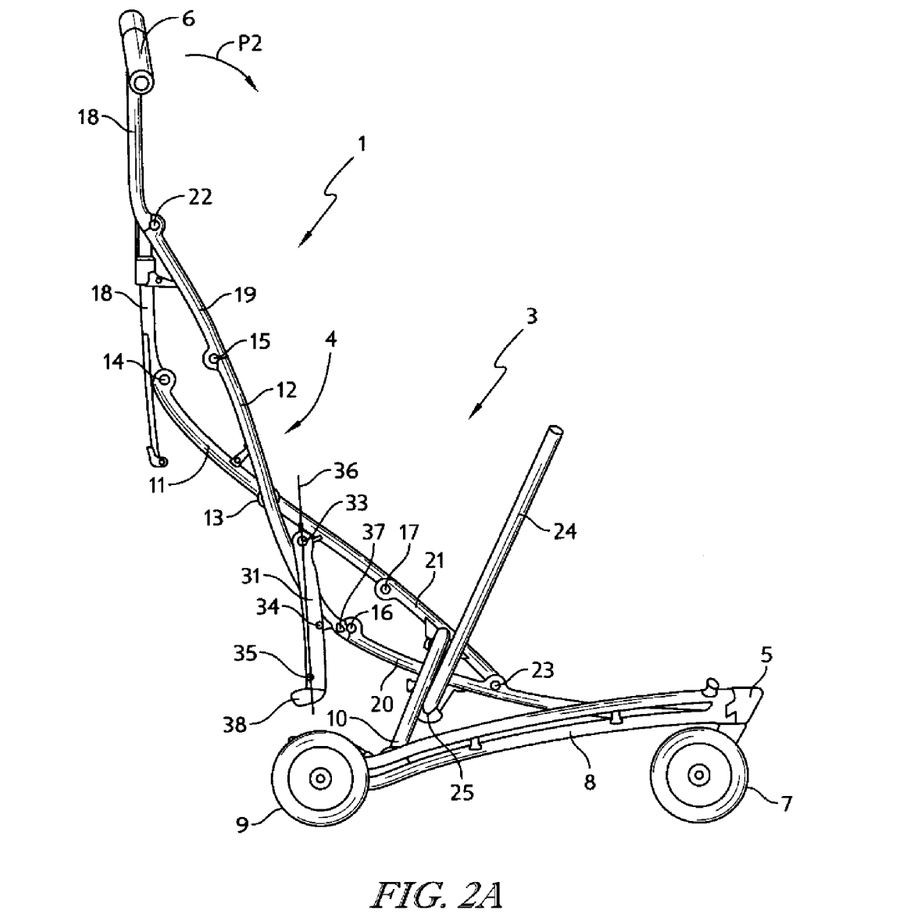
FIG. 2A is a side view of the stroller as shown in FIG. 1A in the erect but unlocked configuration of the seat-support frame.

As a consequence, the spine 4 is convertible between an erect (use) configuration as shown in FIG. 1A via a partly collapsed configuration shown in FIG. 2A and via further collapsed configurations as shown in FIGS. 3A-5 to a fully collapsed storage configuration as shown in FIG. 6. Thus in the collapsed configuration of the spine 4, the first and second frame rods 11, 12 lie generally parallel to and adjacent one another along their lengths as far a this is permitted by the shapes of the rods and the positions of the various pivotable joints and connections.

Each of the elongate, rigid, spine-link rods 10 is pivotably connected at one end to the respective rear-wheel support arm 8 and at its other end to the subsidiary rod 21 of the spine 4. Each of the rigid first and second frame rods 11, 12 and subsidiary rods 18, 19, 20, 21 is curved to define the curved shape of the spine 4 in its erect configuration.

The seat-support frame 3 further comprises elongate, rigid, first and second seat-link rods 24 interconnected at a pivot defining a joint 25. The joint 25 is located on a plate mounted on the subsidiary rod 20. At ends remote of the joint 25 the seat-link rods 24 are connected to parts of the flexible juvenile seat (not shown).

Figure 1B:
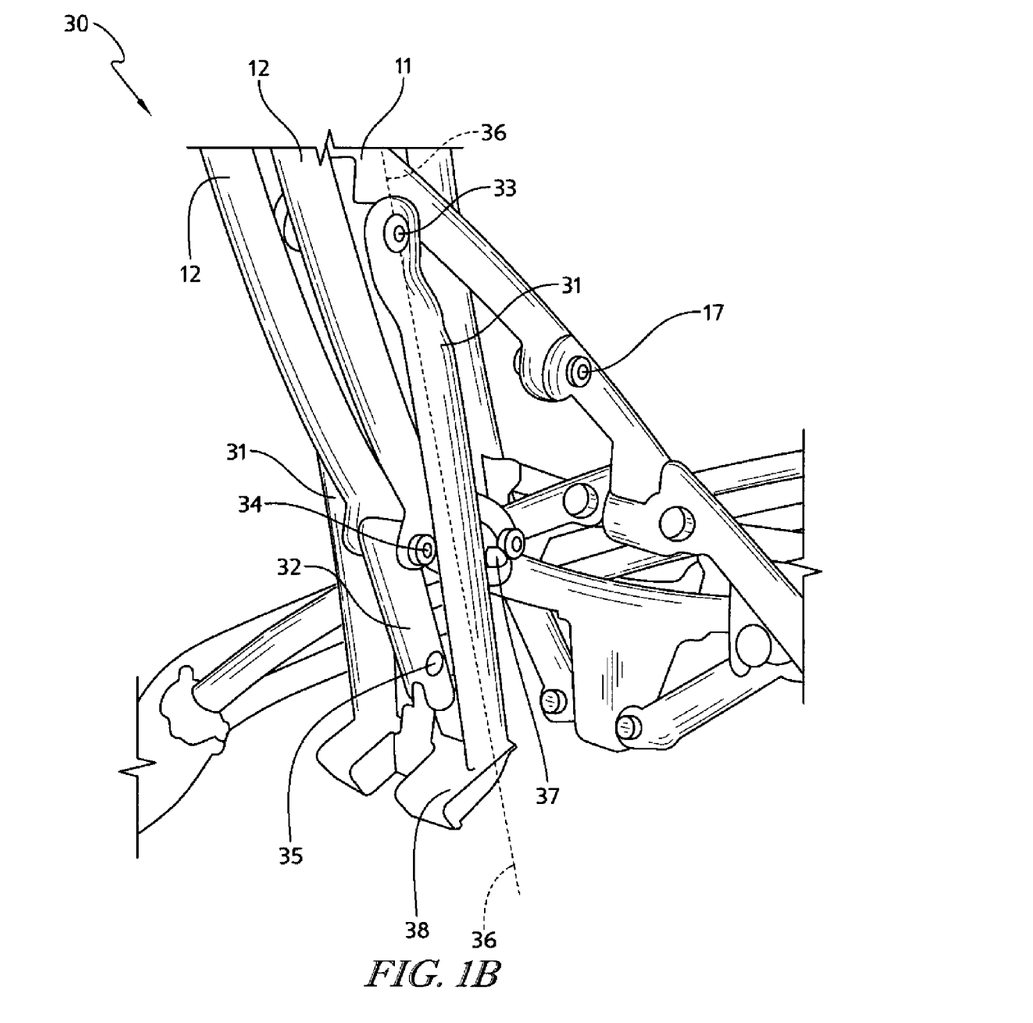
FIG. 1B is an enlarged perspective view of a portion of the stroller as shown in FIG. 1A.

A frame lock 30 included in stroller 1 is provided with two lock members 31, 32 as suggested in FIGS. 1A and 1B. The first lock member 31 is swivelably connected at a first swivel 33 to the elongate rigid first frame member 11. The second lock member 32 is swivelably connected at a second swivel 34 to the elongate rigid second frame rod 12. The first lock member 31 is longer than the second lock member 32 as suggested in FIG. 1A. The first lock member 31 is bifurcated along its whole length except for the ends.

The first and second lock members 31, 32 are pivotably connected to each other at a distance from the first and second swivel 33, 34 at a lock pivot 35. A virtual line 36 can be drawn through the lock pivot 35 and first swivel 33 as shown, for example, in FIG. 1A. In the situation as shown in FIGS. 1A and 1B, the seat-support frame 3 is in its erect configuration and the second swivel 34 is located on one side of the virtual line 36 in a locked first position, wherein the seat-support frame 3 is locked in its erect configuration. In the situation as shown in the FIGS. 1A and 1B, the second swivel 34 is located on the left side of the virtual line 36.

In this locked first position, the first lock member 31 lies in abutment against a stop 37 fixed in a stationary position on the elongated rigid second frame rod 12 as suggested in FIG. 1A. The stop 37 prevents the first lock member 31 from pivoting in a counter clockwise direction about the first swivel 33 and thereby prevents collapsing of the seat-support frame 3.

The first lock member 31 is provided near one end with a pedal 38 as shown, for example, in FIGS. 1A and 1B. The pedal 38 is located on the left side of the lock pivot 35 while the second swivel 34 of the second lock member 32 is also located on the left side of the lock pivot 35 in the erect configuration of the seat-support frame 3 as shown in FIG. 1A.

FIGS. 2A-6 show in several steps the folding of the stroller 1 from the erect (use) configuration as shown in FIGS. 1A and 1B to the fully collapsed (storage) configuration as shown in FIG. 6. These steps are illustrative of one manner of folding the stroller 1 in accordance with the present disclosure.

Before the seat-support frame 3 can be collapsed, the seat-support frame 3 needs to be unlocked manually by a caregiver. To unlock the seat-support frame 3, the caregiver pulls the pedal 38 in a direction indicted by arrow P1 away from front wheel 7, wherein the second swivel 34 is moved under force from the left side of the virtual line 36, via an intermediate position (see FIG. 2A) wherein the second swivel 34 is located on the virtual line 36 between the pivot 35 and the first swivel 33, to the right side of the virtual line 36 (see FIG. 2B).

Figure 2B:
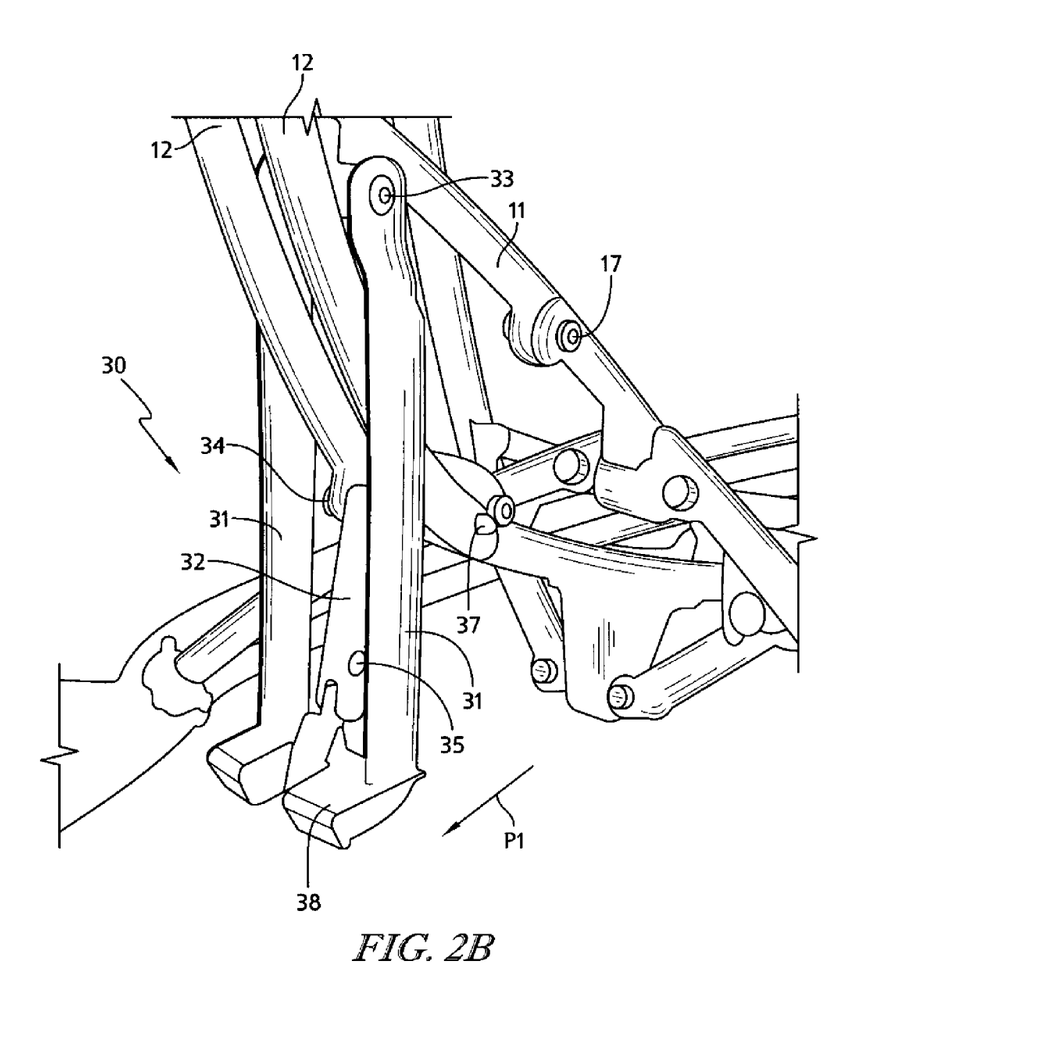
FIG. 2B is an enlarged perspective view of a portion of the stroller as shown in FIG. 2A.
Figure 3A:
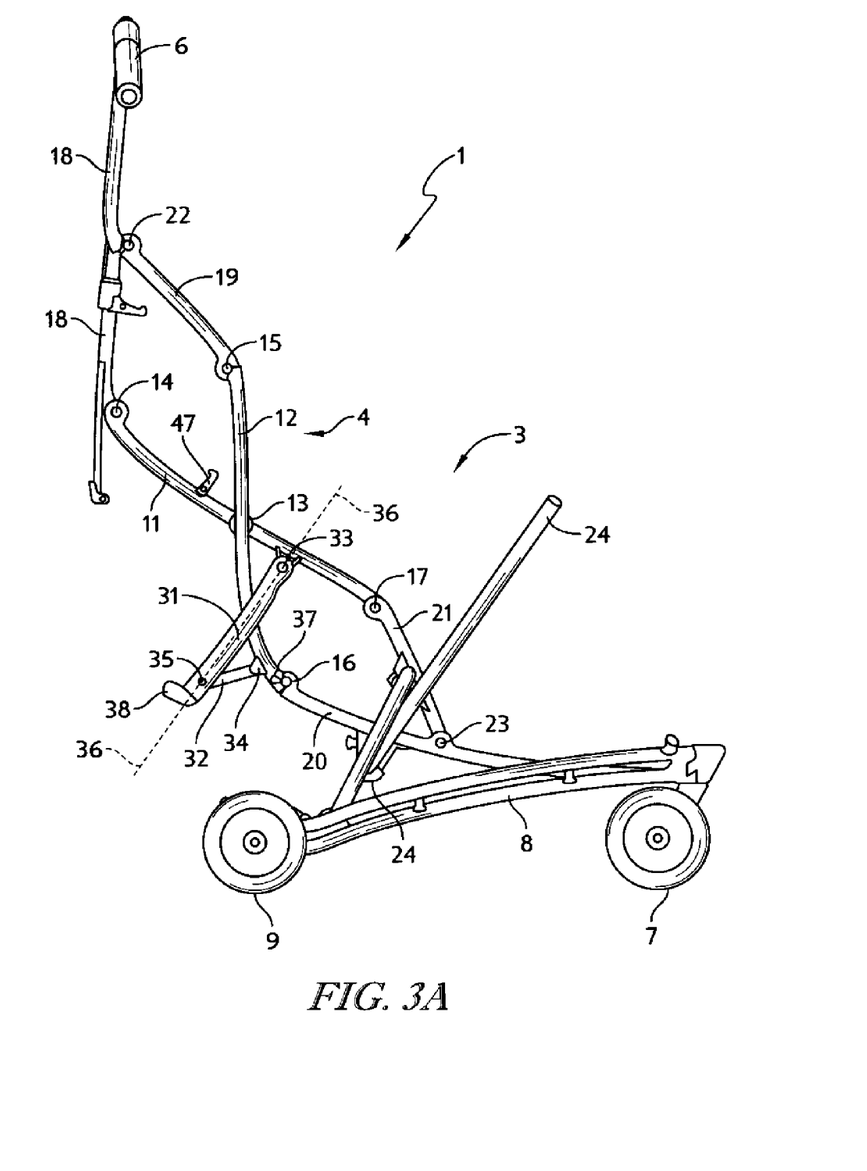
FIG. 3A is a side view of the stroller as shown in FIG. 1A in a partly collapsed configuration of the seat-support frame.
Figure 3B:
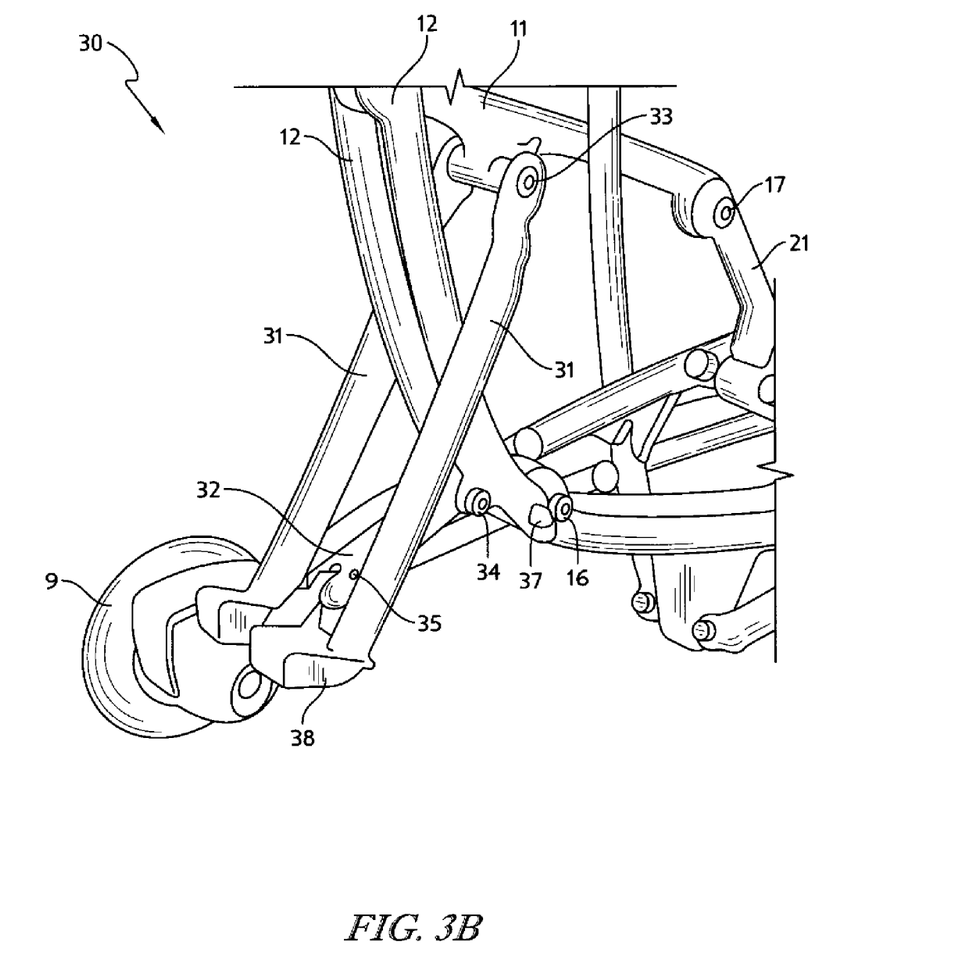
FIG. 3B is an enlarged perspective view of a portion of the stroller as shown in FIG. 3A.
Figure 4:
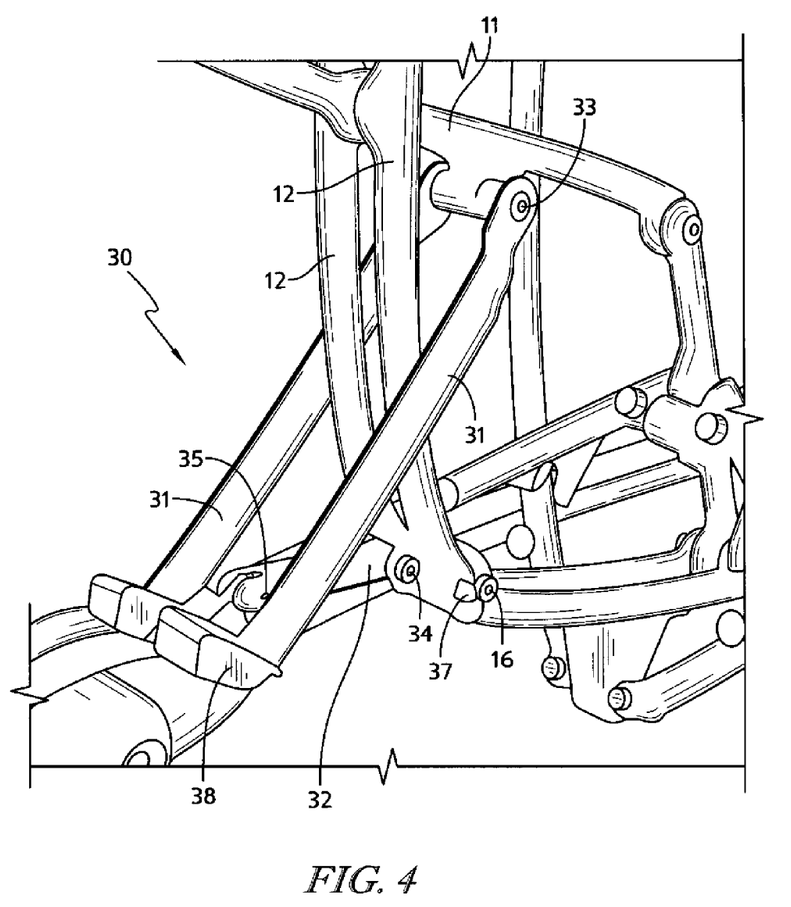
FIG. 4 is an enlarged perspective view of the stroller as shown in FIG. 1A in a further partly collapsed configuration of the seat-support frame.

The second swivel 34 is now in its second position in which the seat-support frame 3 is unlocked and the first and second lock members 31, 32 no longer cooperate to prevent the seat-support frame 3 from collapsing. In this second position, the first lock member 31 can be swiveled easily about the first swivel 33 in clockwise direction away from the pivot 17 on the first rod 11, when the rigid first and second frame rods 11, 12 will be spread apart to collapse the stroller 1.

To fold the stroller 1, the caregiver will push the handle assembly 6 is the direction as indicated by arrow P2 downwardly towards the coupler 5 via the situations as shown in FIGS. 3A, 3B, 4, 5 towards the fully collapsed configuration as shown in FIG. 6.

When moving the spine 4 from its erect configuration to its collapsed configuration, this in turn causes relative movement of the rear-wheel support arms 8 and the other rods and members. Movement of the seat-support frame 3 from its erect configuration to its collapsed configuration may be effected by a caregiver in a one-handed operation in accordance with the present disclosure.

To erect the seat-support frame 3 from its collapsed configuration as shown in FIG. 6 to its erect configuration as shown in FIG. 1A the caregiver simple pulls the handle assembly 6 upwardly away from the coupler 5 until the seat-support frame 3 is in the erect configuration. The first and second lock members 31, 32 will than be in the positions as shown in FIG. 2B, wherein the second swivel 34 is located on the right side of the virtual line 36. To lock the seat-support frame 3 in the erect configuration, the caregiver pushes preferably with his foot on the pedal 38 to move the second swivel 34 from the right to the left of the virtual line 36.

Different views of a second embodiment of a collapsible stroller 41 according to the present disclosure are shown, for example, in FIGS. 7-9. The stroller 41 is similar to the stroller 1 except that the frame lock 42 of stroller 41 is slightly different than the frame lock 30. The frame lock 42 is provided with first and second lock members 31, 31 like frame lock 30 but is further provided with an auxiliary member 43 that is swivelably connected halfway its length at pivot 16 of the second frame rod 12. In the locked position of the seat-support frame 3, as shown in FIG. 7, one part 44 of the auxiliary member 43 lying on one side of the pivot 16 abuts against the first lock member 31, while the other part 45 of the auxiliary member 43 on the other side of the pivot 16 can be used by a caregiver to be pushed on, for example, by means of a foot. When doing so, the auxiliary member 43 will be pivoted in the direction as indicated by arrow P3, wherein a pushing force is being exerted on the first lock member 31 so that the first lock member 31 will be pivoted in the direction as indicated arrow P1 and the second lock swivel 34 will be moved from the right side of the virtual line 36 to the left side of the virtual line 36 to unlock the seat-support frame 3. After unlocking the seat-support frame 3, it can be collapsed in the same manner as described herein.

When the seat-support frame 3 needs to be locked, the caregiver may push on the pedal 38. So both for locking and unlocking the seat-support frame 3, the caregiver can use the sole of her shoe to exert a pushing force on the pedal 38.

As can be seen in both embodiments, the strollers 1, 41 are provided with a first hook 46 mounted on the subsidiary rod 18 which may be locked to the subsidiary rod 19 as an additional lock to prevent inadvertent unlocking of the seat-support frame 3 when a person unintentionally moves the pedal 38 it the direction indicated by arrow P1. Before unlocking the frame lock 30, the additional lock needs to be unlocked. In the collapsed configuration the first hook 46 can be coupled with a second hook 47 mounted on the first frame rod 11 to keep the stroller 1, 41 in its collapsed configuration (see FIG. 6). Instead of the stop 37, other kinds of stops or other means can be used to define the first position of the second swivel 33 within the scope of the present disclosure.

Collapsible stroller 1 includes a frame lock 30 or 42 which can operated after the seat-support frame 3 is brought at least near its erect configuration, wherein the operation of the frame lock 30 or 42 can be done easily by hand or foot. This is achieved by the lock 30 or 42 in that the lock 30 or 42 comprises at least two lock members 31, 32, wherein a first lock member 31 is swivelably connected at a first swivel 33 to the first frame rod 11, a second lock member 32 is swivelably connected at a second swivel 34 to the second frame rod 12, and the first and second lock members 31, 32 are pivotably connected to each other at a distance from the first and second swivels 33, 34 at a lock pivot 35. The second swivel 34 is movable from a locked first position wherein the second swivel 34 is located on one side of a virtual line 36 through the lock pivot 35, and the first swivel 33, in which first position the seat-support frame 3 is locked in its erect configuration, via an intermediate position (see FIG. 2A) wherein the second swivel 34 is located between the lock pivot 35 and first swivel 33 on the virtual line 36, to an unlocked second position (See FIG. 2B) wherein the second swivel 34 is located on the other side of the virtual line 36, in which second position the seat-support frame 3 is unlocked. The movement of the lock pivot 35 from one side of the virtual line 36 to the other side, can be done after the seat-support frame 3 is brought to its erect configuration.

The distances between the first swivel 33 and the lock pivot 35, between the second swivel 34 and the lock pivot 35, and between the first and second swivel 33, 34 determine the force which is needed to be applied by a caregiver to move the second swivel 34 from one side of the virtual line 36 to the other side. These distances can be optimized in accordance with the present disclosure to the desired locking force, independently of the dimensions of the first and second frame rods 11, 12.

Illustratively the first and second lock members 31, 32 are located relative low, for example near the rear wheels 9 of the stroller 1, so that the lock members 31, 32 can be operated by a foot of a caregiver pushing the stroller 1. In this manner the person who unfolds the stroller 1 can use his hands for holding the stroller 1 and/or holding a child before the child can be placed into the stroller 1.

An embodiment of the collapsible stroller 1 according to the present disclosure is characterized in that at least one of the first and second lock members 31, 32 is provided with a pedal 38 for swiveling the lock member with respect to the corresponding frame rod, so that the second swivel 34 is movable form the first position to the second position and/or vice versa. Such a pedal 38 can be operated easily by pressing on it by hand or by foot. In such a manner the frame rod can be swiveled easily. With such a pedal 38, it is possible to lock the seat-support frame 3 by pushing on the pedal 38 and to unlock the seat-support frame 3 by pulling on the pedal 38.

A collapsible stroller according to the present disclosure is characterized in that the pedal 38 is operable by means of a foot of a caregiver. By means of a foot, a relatively large force can be exerted on the pedal 38 both by pushing or pulling on the pedal 38. When pulling on the pedal 38, the foot can be placed behind the pedal 38 and be pulled towards the person operating the stroller.

Collapsible stroller 41 according to another embodiment of the present disclosure is characterized in that the frame lock 42 is provided with an auxiliary member 43 that is swivelably connected to the seat-support frame 3. The auxiliary member 43 cooperates with at least one lock member 31, 32, wherein by swiveling the auxiliary member 43, the lock member is been swiveled with respect to the corresponding frame rod, so that the second swivel 34 is being movable from the first position to the second position and/or vice versa. In this manner a caregiver can use a pushing force both by locking and unlocking the seat-support frame 3. When locking the seat-support frame 13, a pushing force can be exerted on one of the lock members 31, 32. When unlocking the seat-support frame 3, a pushing force can be exerted via the auxiliary member 43 on the other of the lock members 31, 32, or vice-versa.

Collapsible stroller 41 is characterized in that both the pedal 38 and the auxiliary member 43 are operable by pushing thereon by means of a foot of a user, wherein by pushing on the pedal 38 the lock is being locked and, alternatively, by pushing on the auxiliary member 43 the lock is being unlocked. In this manner, in both cases a caregiver can use the sole of her shoe for exerting the pushing force, so that no damage will occur to the upper side of the shoe.

A stroller 1 includes a collapsible seat-support frame 3 and a frame lock 30 as suggested in FIG. 1A, while stroller 41 includes a frame lock 42 as suggested in FIG. 7. Collapsible seat-support frame 3 is configured to move from an erect configuration to a collapsed configuration at the option of a caregiver. The collapsible seat-support frame 13 including an elongate spine 4, a handle assembly 6 coupled to an upper end of the elongate spine 4, a coupler 5 coupled to a lower end of the elongate spine 4, and a wheel unit 7, 8, 9 coupled to the coupler 5 and configured to support the elongate spine 4 for rolling movement relative to ground under the collapsible seat-support frame 3. The elongate spine 4 includes a first frame rod 11, a second frame rod 12, and a movable spine joint 13 coupled to the first and second frame rods 11, 12 and configured to support the second frame rod 12 for pivotable movement about a rod pivot axis 13 during movement of the collapsible seat-support frame 3 from the erect configuration to the collapsed configuration. The wheel unit includes front and rear wheels 7, 9 and rear-wheel support arms 8 as suggested in FIG. 1A.

Frame lock 30 is coupled to the first and second frame rods 11, 12 as suggested in FIG. 1A. Frame lock 30 and 42 is configured to provide means for temporarily blocking pivotable movement of the second frame rod 12 relative to the first frame rod 11 about the rod pivot axis 13 when the collapsible seat-support frame 3 is moved to assume the erect configuration so that the collapsible seat-support frame 3 is retained in the erect configuration. The frame lock 30 (42) is positioned to lie between the movable spine joint 13 and the wheel unit 7, 8, 9 when the collapsible seat-support frame 3 is moved to assume the erect configuration as suggested in FIG. 1A.

The frame lock 30 includes a first lock member 31 swivelably connected at a first swivel 33 to the first frame rod 11 and a second lock member 32 swivelably connected at a second swivel 34 to the second frame rod 12 as suggested in FIG. 1A. The second lock member 32 is pivotably connected to the first lock member 31 at a lock pivot 35 that is arranged to lie in spaced-apart relation to each of the first and second swivels 33, 34. The second swivel 34 is arranged to lie on a first side of a virtual line 36 extending through the lock pivot 35 and the first swivel 33 when the collapsible seat-support frame 3 is moved to assume the erected configuration to lock the collapsible seat-support frame 3 and retain the collapsible seat-support frame 3 in the erect configuration. The second swivel 34 is arranged to lie on an opposite second side of the virtual line 36 in response to pivotable movement of the first lock member 31 about a pivot axis established by the first swivel 33 by a caregiver relative to the second lock member 32 and to the second frame rod 12 to unlock the collapsible seat-support frame 3 and free the collapsible seat-support frame 3 to be moved from the erect configuration to the collapsed configuration.

The stroller 1 further comprises a stop 37 coupled to the second frame rod 12 as suggested in FIGS. 1A and 1B. The stop 37 is arranged to engage the first lock member 31 to block the first lock member 31 from pivoting about the first swivel 33 relative to the first frame member 11 when the collapsible seat-support frame 3 is moved to assume the erect configuration as suggested in FIGS. 1A and 1B.

The first lock member 31 includes a first end coupled to the first frame rod 11 at the first swivel 33 and an opposite second end as suggested in FIGS. 1A and 1B. The second lock member 32 includes a first end coupled to the first lock member 31 at a lock pivot 35 and an opposite second end coupled to the second frame member 12 at the second swivel 34 as suggested in FIG. 1B.

The frame lock 30 further includes a foot pedal 38 coupled to the second end of the first lock member 31 to locate the lock pivot 35 in a position between the first and second ends of the first lock member 31 as suggested in FIGS. 1A and 1B. The foot pedal 38 is configured to provide means for pivoting the first lock member 31 in a first direction about the first swivel 33 to cause the second lock member 32 to move relative to the first lock member 31 to move the second swivel 34 from the first side of the virtual line 36 to the second side of the virtual line 36 and for alternatively pivoting the first lock member 31 in an opposite second direction about the first swivel 33 to cause the second lock member 32 to move relative to the first lock member 31 to move the second swivel 34 from the second side of the virtual line 36 to the first side of the virtual line 36.

The frame lock 42 further includes an auxiliary member 43 as suggested in FIG. 7. Auxiliary member 43 is mounted for swiveling movement of the collapsible seat-support frame 3 to cooperate with at least one of the first and second lock members 31, 32 to provide means for moving the second lock member 32 relative to the first lock member 31 to move the second swivel 34 between the first and second sides of the virtual line 36.

The invention claimed is:

1. A collapsible stroller comprising
a seat-support frame provided with at least two frame rods being pivotably connected to each other, which seat-support frame is foldable from an erect configuration to a collapsed configuration and vice versa, and
a frame lock configured to lock the seat-support frame in its erect configuration, the frame lock including at least two lock members, wherein a first lock member of the at least two lock members is swivelably connected at a first swivel to a first frame rod of the at least two frame rods and a second lock member of the at least two lock members is swivelably connected at a second swivel to a second frame rod of the at least two frame rods, and the first and second lock members are pivotably connected to each other at a distance from the first and second swivels at a lock pivot, wherein the second swivel is movable from a locked first position wherein the second swivel is located on a first side of a virtual line, the virtual line being arranged to extend through the lock pivot and the first swivel, in which locked first position the seat-support frame is locked in its erect configuration and the second swivel is located between the lock pivot and the first swivel on the virtual line to a second position wherein the second swivel is located on a second opposite side of the virtual line, in which second position the seat-support frame is unlocked.

2. The collapsible stroller of claim 1, wherein at least one of the at least two lock members is provided with a pedal for swiveling the at least one lock member with respect to a corresponding frame rod so that the second swivel is being movable from the locked first position to the second position and is also movable from the second position to the first locked position.

3. The collapsible stroller of claim 2, wherein the pedal is operable by a user.

4. The collapsible stroller of claim 3, wherein a locking in the first locked position is configured to be done by pushing on the pedal.

5. The collapsible stroller of claim 1, wherein the frame lock is provided with an auxiliary member being swivelably connected to the seat-support frame, which auxiliary member cooperates with at least one of the at least two lock members, wherein by swiveling the auxiliary member, the at least one lock member is swiveled with respect to a corresponding one of the at least two frame rods, so that the second swivel is movable from the locked first position to the second position and is also movable from the second position to the locked first position.

6. The collapsible stroller of claim 1, wherein at least one of the at least two lock members is provided with pedal means for swiveling the at least one lock member with respect to a corresponding one of the at least two frame rods so that the second swivel is movable from the locked first position to the second position and is also movable from the second position to the first locked position, and both the pedal means and the auxiliary member are operable by pushing thereon by a user, and further wherein by pushing on the pedal means the lock is locked, while by pushing on the auxiliary member the lock is unlocked.

7. The collapsible stroller of claim 1, wherein a first of the at least two frame rods of the seat-support frame is provided with a stop, wherein in the locked first position at least one of the at least two lock members abuts the stop.

8. The collapsible stroller of claim 7, wherein a second of the at least two frame rods is provided with the stop, wherein in the locked first position the first lock member abuts the stop.

9. A stroller comprising
a collapsible seat-support frame configured to move from an erect configuration to a collapsed configuration at the option of a caregiver, the collapsible seat-support frame including an elongate spine, a handle assembly coupled to an upper end of the elongate spine, a coupler coupled to a lower end of the elongate spine, and a wheel unit coupled to the coupler and configured to support the elongate spine for rolling movement relative to ground under the collapsible seat-support frame, wherein the elongate spine includes a first frame rod, a second frame rod, and a movable spine joint coupled to the first and second frame rods and configured to support the second frame rod for pivotable movement about a rod pivot axis during movement of the collapsible seat-support frame from the erect configuration to the collapsed configuration, and
a frame lock coupled to the first and second frame rods and configured to provide means for temporarily blocking pivotable movement of the second frame rod relative to the first frame rod about the rod pivot axis when the collapsible seat-support frame is moved to assume the erect configuration so that the collapsible seat-support frame is retained in the erect configuration, wherein the frame lock is positioned to lie between the movable spine joint and the wheel unit when the collapsible seat-support frame is moved to assume the erect configuration.

10. The stroller of claim 9, wherein the frame lock includes a first lock member swivelably connected at a first swivel to the first frame rod and a second lock member swivelably connected at a second swivel to the second frame rod and pivotably connected to the first lock member at a lock pivot that is arranged to lie in spaced-apart relation to each of the first and second swivels and wherein the second swivel is arranged to lie on a first side of a virtual line extending through the lock pivot and the first swivel when the collapsible seat-support frame is moved to assume the erected configuration to lock the collapsible seat-support frame and retain the collapsible seat-support frame in the erect configuration, and wherein the second swivel is arranged to lie on an opposite second side of the virtual line in response to pivotable movement of the first lock member about a pivot axis established by the first swivel by a caregiver relative to the second lock member and to the second frame rod to unlock the collapsible seat-support frame and free the collapsible seat-support frame to be moved from the erect configuration to the collapsed configuration.

11. The stroller of claim 10, further comprising a stop coupled to the second frame rod and arranged to engage the first lock member to block the first lock member from pivoting about the first swivel relative to the first frame member when the collapsible seat-support frame is moved to assume the erect configuration.

12. The stroller of claim 10, wherein the first lock member includes a first end coupled to the first frame rod at the first swivel and an opposite second end, the second lock member includes a first end coupled to the first lock member at a lock pivot and an opposite second end coupled to the second frame member at the second swivel, and the frame lock further includes a pedal coupled to the second end of the first lock member to locate the lock pivot in a position between the first and second ends of the first lock member, and the pedal is configured to provide means for pivoting the first lock member in a first direction about the first swivel to cause the second lock member to move relative to the first lock member to move the second swivel from the first side of the virtual line to the second side of the virtual line and for alternatively pivoting the first lock member in an opposite second direction about the first swivel to cause the second lock member to move relative to the first lock member to move the second swivel from the second side of the virtual line to the first side of the virtual line.

13. The stroller of claim 10, wherein the frame lock further includes an auxiliary member mounted for swiveling movement of the collapsible seat-support frame to cooperate with at least one of the first and second lock members to provide means for moving the second lock member relative to the first lock member to move the second swivel between the first and second sides of the virtual line.

* * * * *